US011456637B2

(12) United States Patent
Sakauchi et al.

(10) Patent No.: US 11,456,637 B2
(45) Date of Patent: Sep. 27, 2022

(54) MOTOR WITH ROTOR HOLDER HAVING FIRST AND SECOND MAGNETS WITH DIFFERENT INTERVALS TO HOLDER

(71) Applicant: Nidec Corporation, Kyoto (JP)

(72) Inventors: Akira Sakauchi, Kyoto (JP); Yusuke Ichioka, Kyoto (JP); Takahiro Suginohara, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 523 days.

(21) Appl. No.: 16/535,457

(22) Filed: Aug. 8, 2019

(65) Prior Publication Data

US 2020/0106317 A1    Apr. 2, 2020

(30) Foreign Application Priority Data

Sep. 28, 2018   (JP) .............................. JP2018-183576

(51) Int. Cl.
*H02K 1/27*         (2022.01)
*H02K 1/2786*       (2022.01)
(Continued)

(52) U.S. Cl.
CPC .......... *H02K 1/2786* (2013.01); *H02K 1/146* (2013.01); *H02K 21/22* (2013.01); *H02K 2201/03* (2013.01)

(58) Field of Classification Search
CPC ........ H02K 1/278; H02K 1/27; H02K 1/2786; H02K 1/2753; H02K 1/274; H02K 1/146; H02K 21/22; H02K 2201/03
(Continued)

(56) References Cited

U.S. PATENT DOCUMENTS 4,748,359 A * 5/1988 Yahara ................... H02K 1/278
                                                310/156.28
6,940,205 B1 * 9/2005 Murakami ............. H02K 1/278
                                                310/156.01
(Continued)

FOREIGN PATENT DOCUMENTS

CN    105119454 A    12/2015
CN    107294239 A    10/2017
(Continued)

OTHER PUBLICATIONS

Official Communication issued in corresponding Chinese Patent Application No. 201910826357.8, dated May 7, 2021.

*Primary Examiner* — Maged M Almawri
(74) *Attorney, Agent, or Firm* — Keating & Bennett (57) ABSTRACT

A motor includes a stationary unit including a stator and a rotation unit including a magnet unit disposed radially outward of the stator and a cylindrical rotor holder. The magnet unit is held on a radially inside surface of the rotor holder. The magnet unit includes first magnets each of which has N and S poles magnetized in a radial direction, and second magnets each of which has N and S poles magnetized in a circumferential direction. Magnetic poles of radially inner end portions of the first magnets adjacent to each other in the circumferential direction via the second magnet are different from each other. Magnetic poles of circumferential end portions of the second magnets adjacent to each other in the circumferential direction via the first magnet are different from each other. An interval is provided between a radially outside surface of each first magnet and the radially inside surface of the rotor holder, and between a radially outside surface of each second magnet and the radially inside surface of the rotor holder.

6 Claims, 4 Drawing Sheets

(51) Int. Cl.
*H02K 21/22* (2006.01)
*H02K 1/14* (2006.01)

(58) Field of Classification Search
USPC ............ 310/156.08–156.15, 156.28, 156.29, 310/156.38, 156.43, 156.45, 154.13
See application file for complete search history.

(56) References Cited

U.S. PATENT DOCUMENTS

| | | | | |
|---|---|---|---|---|
| 8,030,817 | B2* | 10/2011 | Sakai | H02K 1/2766 310/156.43 |
| 8,040,009 | B2* | 10/2011 | Aota | H02K 1/276 310/156.38 |
| 9,331,532 | B2* | 5/2016 | Zhang | H02K 21/024 |
| 2007/0252468 | A1* | 11/2007 | Lee | H02K 1/2766 310/156.56 |
| 2009/0267438 | A1* | 10/2009 | Murakami | H02K 1/278 310/156.28 |
| 2009/0315424 | A1* | 12/2009 | Vollmer | H02K 1/278 310/156.43 |
| 2010/0019587 | A1* | 1/2010 | Sato | H01F 7/0268 310/156.43 |
| 2010/0019590 | A1* | 1/2010 | Guedes-Pinto | H02K 15/12 310/156.28 |
| 2010/0019598 | A1* | 1/2010 | Saban | H02K 1/165 310/156.12 |
| 2010/0033036 | A1* | 2/2010 | Ortt | H02K 1/17 310/156.38 |
| 2010/0117473 | A1* | 5/2010 | Masoudipour | H02K 1/278 310/156.28 |
| 2010/0126234 | A1* | 5/2010 | Maekawa | H02K 21/22 310/156.43 |
| 2010/0133939 | A1* | 6/2010 | Takemoto | H02K 29/03 310/156.43 |
| 2012/0025654 | A1* | 2/2012 | Bach | H02K 1/278 310/156.31 |
| 2015/0162789 | A1* | 6/2015 | Tanaka | H02K 1/278 310/156.28 |
| 2018/0248429 | A1 | 8/2018 | Sakauchi et al. | |
| 2020/0161939 | A1* | 5/2020 | Takahashi | H02K 1/2766 |

FOREIGN PATENT DOCUMENTS

| | | |
|---|---|---|
| CN | 108512383 A | 9/2018 |
| JP | 2015-142484 A | 8/2015 |

* cited by examiner

MOTOR WITH ROTOR HOLDER HAVING FIRST AND SECOND MAGNETS WITH DIFFERENT INTERVALS TO HOLDER

CROSS REFERENCE TO RELATED APPLICATION

The present invention claims priority under 35 U.S.C. § 119 to Japanese Application No. 2018-183576 filed on Sep. 28, 2018, the entire contents of which are hereby incorporated herein by reference.

1. FIELD OF THE INVENTION

The present disclosure relates to a motor.

2. BACKGROUND

An outer rotor type motor in which a magnet unit is disposed on a radial outward of a stator has been conventionally known. The structure of an outer peripheral surface of each permanent magnet is provided on the inner circumferential surface of the cylindrical member. Thus, a shape of each permanent magnet is processed into a shape along the inner circumferential surface of the cylindrical member. Consequently, processing of the permanent magnet becomes difficult, and a cost required for processing also increases.

SUMMARY

Example embodiments of the present disclosure provide motors that each facilitate manufacture of a magnet used for a magnet unit.

A motor according to an example embodiment of the present disclosure includes a stationary unit including a stator annularly surrounding a vertically extending central axis, and a rotation unit including a magnet unit disposed on a radial outward of the stator. The rotation unit further includes a cylindrical rotor holder extending in an axial direction. The magnet unit is held on a radially inside surface of the rotor holder. The magnet unit includes a plurality of first magnets each of which has N and S poles magnetized in a radial direction, and a plurality of second magnets each of which has N and S poles magnetized in a circumferential direction. Each first magnet and each second magnet are adjacent to each other in the circumferential direction. Magnetic poles of radially inner end portions of the first magnets adjacent to each other in the circumferential direction via the second magnet are different from each other. Magnetic poles of circumferential end portions of the second magnets adjacent to each other in the circumferential direction via the first magnet are different from each other. An interval is provided between a radially outside surface of the first magnet and the radially inside surface of the rotor holder, and an interval is provided between a radially outside surface of the second magnet and the radially inside surface of the rotor holder.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings.

In the present specification, in a motor 100, a direction parallel to a central axis CA is referred to as "axial direction". Among the axial directions, a direction from a bracket 12 described later to a shaft holder 22 is referred to as "upper", and a direction from the shaft holder 22 to the bracket 12 is referred to as "lower".

An orthogonal direction to the central axis CA is referred to as "radial direction". Among the radial directions, a direction approaching the central axis CA is referred to as "radial inward", and a direction away from the central axis CA is referred to as "radial outward".

A rotation direction around the central axis CA is referred to as "circumferential direction".

The directions described above are not intended to limit directions in a case of incorporation into an actual apparatus.

Figure 1:
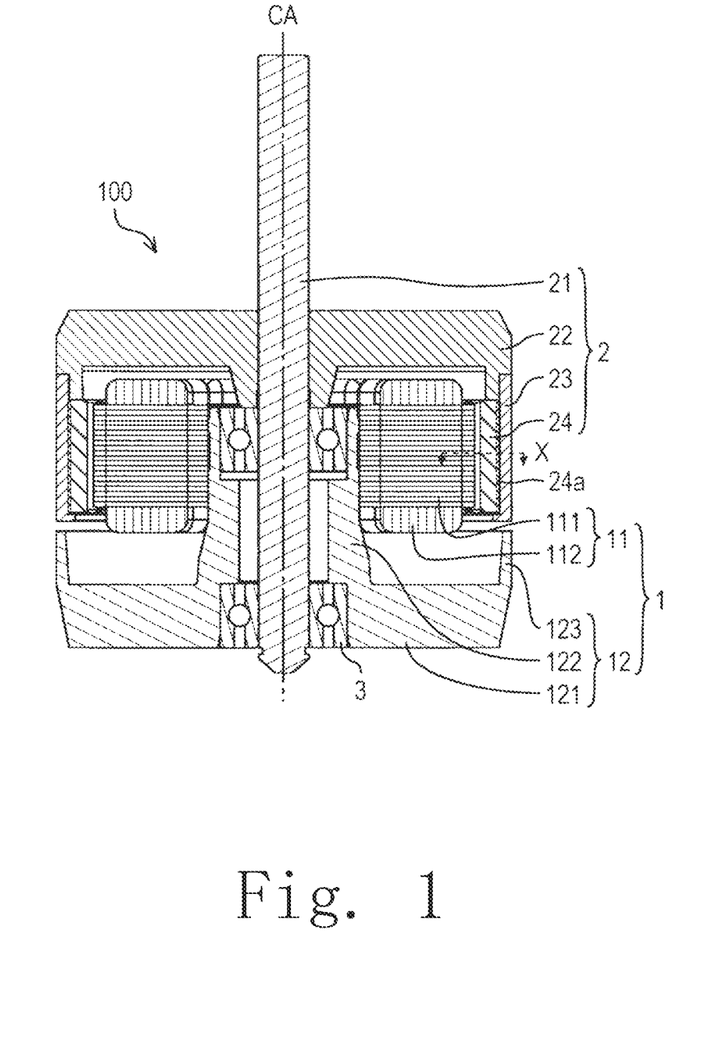
FIG. 1 is a sectional view illustrating a configuration example of a motor of an example embodiment of the present disclosure.

FIG. 1 is a sectional view illustrating a configuration example of the motor 100. FIG. 1 illustrates a sectional structure of the motor 100 when the motor 100 is cut along a virtual plane including the central axis CA.

As shown in FIG. 1, the motor 100 includes a stationary unit 1 and a rotation unit 2. The stationary unit 1 has a stator 11 described later annularly surrounding the central axis CA extending in a vertical direction. The rotation unit 2 has a magnet unit 24 described later disposed on a radial outward of the stator 11. The motor 100 further includes bearings 3.

The stationary unit 1 includes the above-described stator 11 and the bracket 12.

The stator 11 drives the rotation unit 2 around the central axis CA. More specifically, the stator 11 drives the rotation unit 2 to rotate in the circumferential direction. The stator 11 is supported by a bearing holder 122 described later of the bracket 12.

The stator 11 has a stator core 111, insulators (not shown), and a plurality of coil units 112. The stator core 111 is an annular magnetic body centered on the central axis CA, and in the present example embodiment, it is a layered body in which a plurality of plate-like electromagnetic steel sheets are layered. The stator core 111 is fixed to the bearing holder 122. In the present example embodiment, a radially inner end portion of the stator core 111 is fixed to a radially outside surface of the bearing holder 122. A radially outside surface of the stator core 111 is radially opposite to the magnet unit 24. Each of the plurality of coil units 112 is a winding member in which a conductor wire is wound around the stator core 111 via the insulator having electrical insulation.

The bracket 12 has a lower lid part 121, the bearing holder 122, and an outer wall part 123.

The lower lid part 121 has an annular shape centered on the central axis CA and a plate shape spreading in the radial direction. The bearing holder 122 is provided at a radially inner end portion of the lower lid part 121. The outer wall part 123 is provided at a radially outer end portion of the lower lid part 121.

The bearing holder 122 has a cylindrical shape extending in the axial direction centered on the central axis CA. The bearing holder 122 projects upward from the radially inner end portion of the lower lid part 121. The bearing holder 122 supports the stator 11. A radially inner end portion of the stator 11 is fixed to the bearing holder 122. Inside the bearing holder 122, the bearings 3 are provided. In the present example embodiment, the bearings 3 are respectively provided on an axial upper portion and an axial lower portion of the motor 100. A shaft 21 described later is inserted into the bearing holder 122 and the bearings 3. The bearing holder 122 rotatably supports the shaft 21 via the bearings 3. Although each of the bearings 3 is a ball bearing in this example embodiment, it is not limited to this exemplification, for example, a sleeve bearing may be permissible.

In the present example embodiment, the outer wall part 123 is cylindrical around the central axis CA, and extends in the axial direction. The outer wall part 123 protrudes upward from the radially outer end portion of the lower lid part 121.

The rotation unit 2 will be described hereinbelow. The rotation unit 2 includes the shaft 21, the shaft holder 22, a rotor holder 23, and the above-described magnet unit 24.

The shaft 21 is a rotation axis of the rotation unit 2. The shaft 21 is rotatable around the central axis CA together with the shaft holder 22, the rotor holder 23, and the magnet unit 24. The shaft 21 is not limited to this exemplification, and may be a fixed shaft attached to the stationary unit 1. When the shaft 21 is the fixed shaft, the bearing is provided between the shaft 21 and the shaft holder 22.

The shaft holder 22 is attached to the shaft 21 at the axial upper portion of the motor 100. In the present example embodiment, the shaft holder 22 is fixed to the shaft 21 and spreads to the radial outward from a radially outside surface of the shaft 21.

The rotor holder 23 has a tubular shape extending in the axial direction. As described above, the rotation unit 2 has the rotor holder 23. The magnet unit 24 is held on a radially inside surface of the rotor holder 23. The rotor holder 23 is provided at a radially outer end portion of the shaft holder 22 and extends downward from the radially outer end portion. An upper end portion of the rotor holder 23 is covered with the shaft holder 22.

Figure 2:
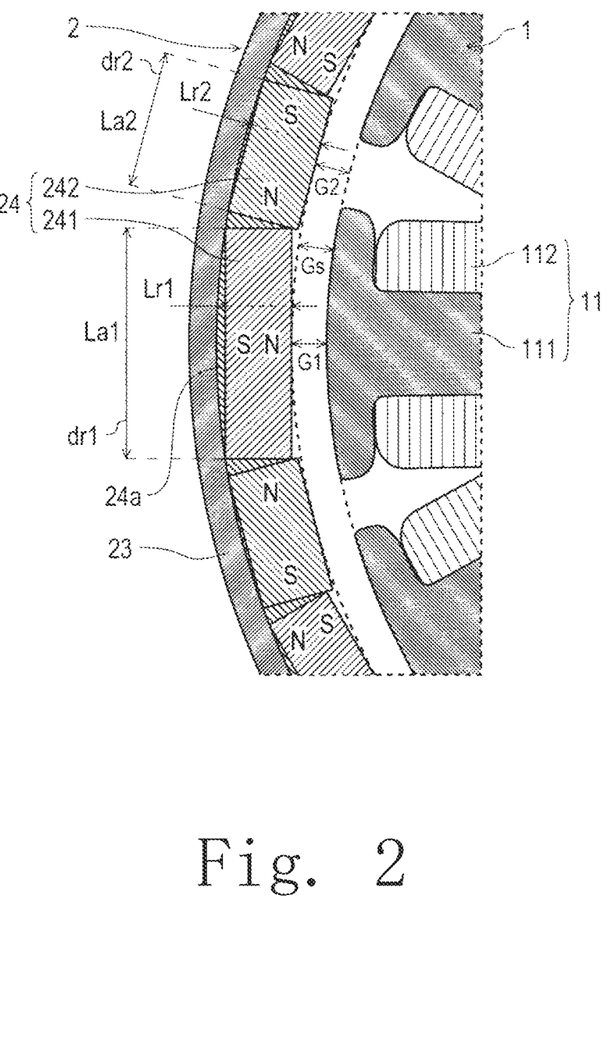
FIG. 2 is a sectional view of a motor illustrating a configuration example of a magnet unit of an example embodiment of the present disclosure.

FIG. 2 is a sectional view of the motor 100 illustrating a configuration example of the magnet unit 24. FIG. 2 is a partial cross section of the motor 100 as viewed from above at a broken line X in FIG. 1. In FIG. 2, an illustration of the insulator is omitted. In FIG. 2, a symbol N represents an N pole of the magnet. A symbol S represents an S pole of the magnet.

The magnet unit 24 is radially opposite to a radially outside surface of the stator 11. As shown in FIG. 2, the magnet unit 24 includes a plurality of first magnets 241 and a plurality of second magnets 242. In each of the first magnets 241, the N pole and the S pole are magnetized in the radial direction. In each of the second magnets 242, the N pole and the S pole are magnetized in the circumferential direction.

The first magnets 241 and the second magnets 242 are arranged in the circumferential direction in a Halbach array. More specifically, each first magnet 241 and each second magnet 242 are arranged adjacent to each other in the circumferential direction. Magnetic poles of radially inner end portions of the first magnets 241 adjacent to each other in the circumferential direction via the second magnet 242 are different from each other. Magnetic poles of one circumferential end portions of the second magnets 242 adjacent to each other in the circumferential direction via the first magnet 241 are different from each other. By arranging the first magnets 241 and the second magnets 242 in the Halbach array, a magnetic field of a radial inward of the first magnets 241 and the second magnets 242 becomes stronger. On the other hand, a magnetic field of a radial outward of the first magnets 241 and the second magnets 242 becomes weaker. Since the magnetic field on a side of the rotor holder 23 is weakened, magnetic saturation in the rotor holder 23 is suppressed. Thus, a thickness in the radial direction of the rotor holder 23 becomes thinner.

The first magnets 241 and the second magnets 242 are provided on the radially inside surface of the rotor holder 23. In the present example embodiment, both circumferential end portions at a radially outer end of each first magnet 241 and both circumferential end portions at a radially outer end of each second magnet 242 are in contact with the radially inside surface of the rotor holder 23. Intervals are provided between a radially outside surface of each first magnet 241 and the radially inside surface of the rotor holder 23 and between a radially outside surface of each second magnet 242 and the radially inside surface of the rotor holder 23, respectively. The interval between the radially outside surface of each first magnet 241 and the radially inside surface of the rotor holder 23 is a space surrounded by the radially outside surface of the first magnet 241 and the radially inside surface of the rotor holder 23. The interval between the radially outside surface of each second magnet 242 and the radially inside surface of the rotor holder 23 is a space surrounded by the radially outside surface of the second magnet 242 and the radially inside surface of the rotor holder 23.

In this case, the radially outside surface of each first magnet 241 and the radially outside surface of each second magnet 242 need not be formed to conform to the radially inside surface of the rotor holder 23. Thus, manufacture of the magnets 241, 242 used for the magnet unit 24 is facilitated.

For example, as described later, adhesive 24*a* or the like is fillable between the radially outside surface of each first magnet 241 and the radially outside surface of each second magnet 242 and the radially inside surface of the rotor holder 23. In particular, even in a case where the adhesive 24*a* includes particles each having a relatively large diameter of, for example, about 30 μm as a curing agent, the adhesive 24*a* is fillable between the radially outside surface of the first magnet 241 and the radially outside surface of the second magnet 242 and the radially inside surface of the rotor holder 23.

In the present example embodiment, each of the radially outside surface of the first magnet 241 and the radially outside surface of the second magnet 242 is a plane perpendicular to the radial direction. Shapes of each first magnet 241 and each second magnet 242 are rectangular parallelepipeds respectively. In this case, the first magnet 241 and the second magnet 242 are formed in the simple shapes. Thus, the manufacture of the first magnet 241 and the second magnet 242 is further facilitated. The shapes of the first magnet 241 and the second magnet 242 are not limited to these exemplifications, and the first magnet 241 and the second magnet 242 may have any shapes as long as gaps are provided between their radially outside surfaces and the radially inside surface of the rotor holder 23 respectively. For example, at least one of the radially outside surface of each first magnet 241 and the radially outside surface of each second magnet 242 may be a curved surface. In addition, the shape of at least one of the first magnet 241 and the second magnet 242 may not be the rectangular parallelepiped.

In this example embodiment, between the radially outside surface of each first magnet 241 and the radially inside surface of the rotor holder 23 and between the radially outside surface of each second magnet 242 and the radially inside surface of the rotor holder 23, the adhesive 24a is provided. Thus, the first magnets 241 and the second magnets 242 are more firmly fixed to the radially inside surface of the rotor holder 23 by the adhesive 24a.

The present disclosure is not limited to this exemplification, and the adhesive 24a may be provided either between the radially outside surface of each first magnet 241 and the radially inside surface of the rotor holder 23 or between the radially outside surface of each second magnet 242 and the radially inside surface of the rotor holder 23. That is, at least one of at least a portion of the radially outside surface of each of the first magnets 241 and at least a portion of the radially outside surface of each of the second magnets 242 is opposite to the radially inside surface of the rotor holder 23 via the adhesive 24a. In this case, at least one of each first magnet 241 and each second magnet 242 is attached to the radially inside surface of the rotor holder 23 more firmly by the adhesive 24a.

In the present example embodiment, an interval is provided between one circumferential side surface of the first magnet 241 and the other circumferential side surface of the second magnet 242 circumferentially adjacent to the first magnet 241. The interval is a space surrounded by the one circumferential side surface of the first magnet 241, the other circumferential side surface of the second magnet 242 circumferentially adjacent to the first magnet 241, and the radially inside surface of the rotor holder 23. The adhesive 24a is provided in the interval. By doing so, the first magnet 241 and the second magnet 242 circumferentially adjacent are fixed to each other. The present disclosure is not limited to this exemplification. No gap may be provided between both of them, and the adhesive 24a may not be provided between them. For example, the entire one circumferential side surface of one of the first magnet 241 and the second magnet 242 circumferentially adjacent to the first magnet 241 may be in contact with the other circumferential side surface of the other of the first magnet 241 and the second magnet 242. In the present example embodiment, the one circumferential side surface of the first magnet 241 is the surface facing the second magnet 242 circumferentially adjacent. The other circumferential side surface of the second magnet 242 is the surface facing the first magnet 241 circumferentially adjacent.

The adhesive 24a is not limited to the above-described exemplification, and may be provided between the one circumferential side surface of each first magnet 241 and the other circumferential side surface of each second magnet 242 circumferentially adjacent to the first magnet 241 instead of providing between the radially outside surface of each first magnet 241 and the radially outside surface of each second magnet 242 and the radially inside surface of the rotor holder 23.

In order to prevent the magnet unit 24 from coming into contact with the stator 11 when the rotation unit 2 rotates, each of a gap G1 in the radial direction between each first magnet 241 and the stator 11 and a gap G2 in the radial direction between each second magnet 242 and the stator 11 is set to a constant value Gs (for example, 0.22 mm) or more.

The gap G1 and the gap G2 are preferably set to smaller values. By doing so, the stator 11 rotates the rotation unit 2 more efficiently.

Thus, in the present example embodiment, the gap G2 in the radial direction between the second magnet 242 and the stator 11 is the same as the gap G1 in the radial direction between the first magnet 241 and the stator 11. For example, each of the gap G1 and the gap G2 is the same as the constant value Gs. By doing so, both each of the first magnets 241 and each of the second magnets 242 are brought closer to the stator 11. Thus, magnetic forces exerted by each first magnet 241 and each second magnet 242 on the stator 11 become stronger.

As described above, in the present example embodiment, each first magnet 241 and each second magnet 242 are rectangular parallelepipeds. In the present example embodiment, a distance between the one circumferential side surface and the other circumferential side surface of each first magnet 241 is referred to as a circumferential length La1. A distance between the one circumferential side surface and the other circumferential side surface of each second magnet 242 is referred to as a circumferential length La2. A distance between a radially inside surface and the radially outside surface of each first magnet 241 is referred to as a radial length Lr1. A distance between a radially inside surface and the radially outside surface of each second magnet 242 is referred to as a radial length Lr2.

More strictly, the circumferential length La1 is a length of the radially inner end portion of the first magnet 241 in a direction dr1 that is perpendicular to the axial direction and parallel to the radially inside surface of the first magnet 241. The circumferential length La2 is a length of a radially inner end portion of the second magnet 242 in a direction dr2 that is perpendicular to the axial direction and parallel to the radially inside surface of the second magnet 242. The radial length Lr1 is a length of the first magnet 241 in the radial direction passing through a point closest to the stator 11 at the radially inner end portion of the first magnet 241. The radial length Lr2 is a length of the second magnet 242 in the radial direction passing through a point closest to the stator 11 at the radial inner end portion of the second magnet 242.

The first magnets 241 and the second magnets 242 are densely arranged in the circumferential direction. Thus, in the present example embodiment, the circumferential end portion at the radially inner end portion of one of the first magnet 241 and the second magnet 242 is closed to a circumferential side surface of the other of the first magnet 241 and the second magnet 242. For example, in a case in which the circumferential length La1 of each first magnet 241 is longer than the circumferential length La2 of each second magnet 242, when both the first magnets 241 and the second magnets 242 are brought closer to the stator 11, the radial length Lr2 of each second magnet 242 is longer than the radial length Lr1 of each first magnet 241. In that case, as shown in FIG. 2, the circumferential end portion at the radially inner end portion of the first magnet 241 is in contact with the circumferential side surface of the second magnet 242. When $La1<La2$ is satisfied and $Lr1>Lr2$ is satisfied, the circumferential end portion at the radially inner end portion of the second magnet 242 is closed to the circumferential side surface of the first magnet 241. When $La1=La2$ is satisfied and $Lr1=Lr2$ is satisfied, the circumferential end portion at the radially inner end portion of the first magnet 241 is closed to the circumferential end portion at the radially inner end portion of the second magnet 242.

The circumferential length La1 of each first magnet 241 is preferably longer than the circumferential length La2 of each second magnet 242.

Figure 3:
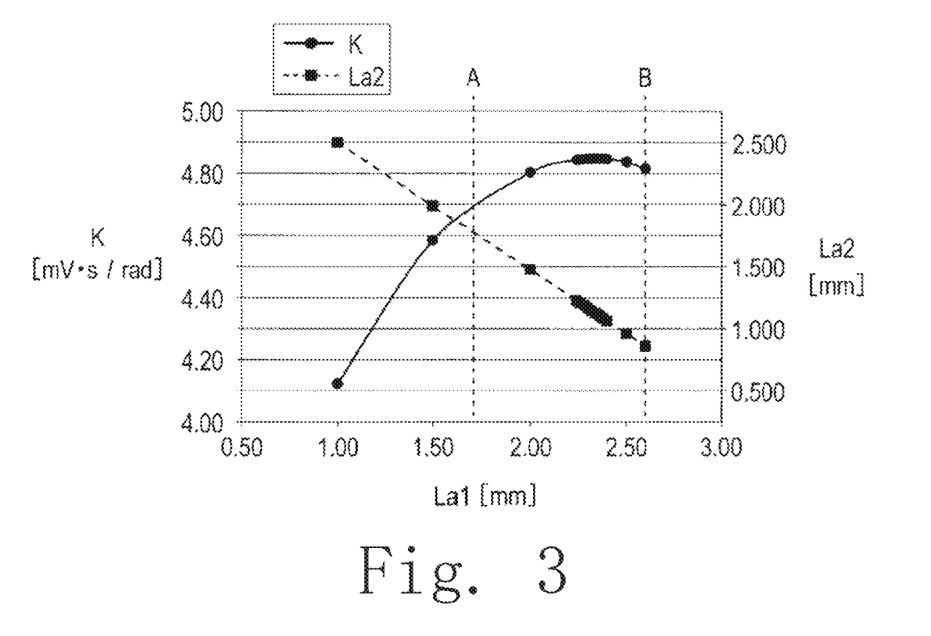
FIG. 3 is a graph illustrating a change in a back electromotive force constant and a change in a circumferential length of a second magnet with respect to a change in a circumferential length of a first magnet.

The smaller the gap G1 and the gap G2 between each first magnet 241 and each second magnet 242 and the stator 11 respectively are, the stronger the magnetic forces exerted on the stator 11 by each first magnet 241 and each second magnet 242 respectively becomes. For example, in a case in which a circumferential length of the radially inside surface of the rotor holder 23 is constant and the first magnets 241 and the second magnets 242 are densely arranged in the circumferential direction as shown in FIG. 2, when the circumferential length La1 of each first magnet 241 becomes longer, the circumferential length La2 of each second magnet 242 becomes shorter. When the gap G1 and the gap G2 have the constant value Gs (for example, 0.22 mm) and the circumferential length of the radially inside surface of the rotor holder 23 is constant, the longer the circumferential length La1 of each first magnet 241 is made, as shown in FIG. 3, the larger a back electromotive force constant K of the motor 100 becomes. Furthermore, when La1>La2 is satisfied beyond a condition A in FIG. 3, the back electromotive force constant K of the motor 100 is made sufficiently large (for example, 4.7 mV·s/rad or more).

The back electromotive force constant K is a constant that indicates efficiency of converting power into rotational energy of the motor 100. As the back electromotive force constant K is larger, the motor 100 generates a larger output.

In FIG. 3, under a condition B, the circumferential length La1 of each first magnet 241 is three times the circumferential length La2 of each second magnet 242. In the present example embodiment, in a region where La1>(3×La2) is satisfied on a right side of the condition B, the circumferential length La2 of each second magnet 242 becomes thin, and actually exceeds a processing limit. Thus, in FIG. 3, plotting up to the condition B in which the circumferential length La1 is three times the circumferential length La2 is performed.

In addition, when La1>La2 is satisfied, the radial length Lr2 of each second magnet 242 is preferably longer than the radial length Lr1 of each first magnet 241.

Figure 4:
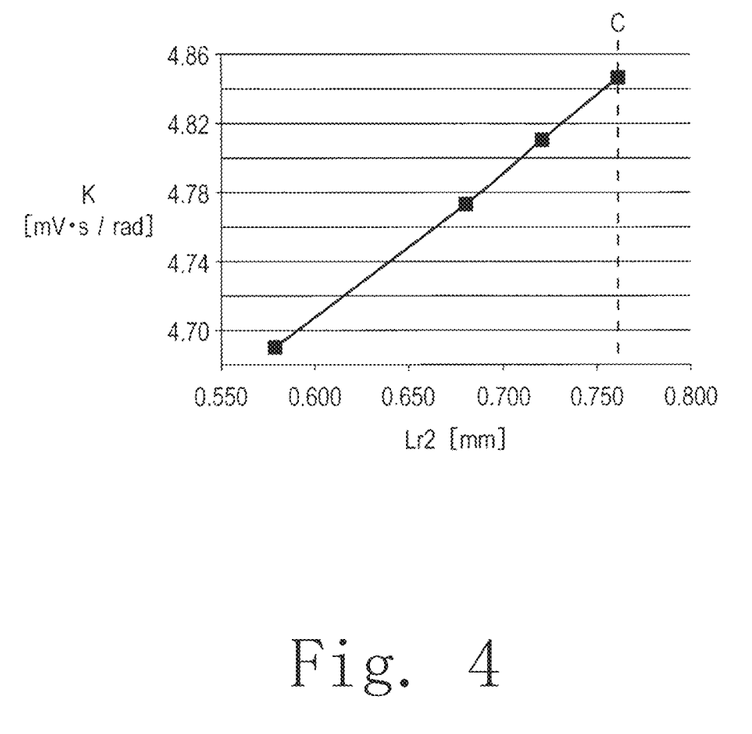
FIG. 4 is a graph illustrating the change in the back electromotive force constant with respect to a change in a radial length of the second magnet.

As the circumferential length La1 of each first magnet 241 becomes longer, the interval between the radially outside surface of each first magnet 241 and the radially inside surface of the rotor holder 23 becomes wider. As the circumferential length La2 of each second magnet 242 becomes shorter, the interval between the radially outside surface of each second magnet 242 and the radially inside surface of the rotor holder 23 becomes narrower. Thus, for example, in a case in which the circumferential length of the radially inside surface of the rotor holder 23 is constant, the first magnets 241 and the second magnets 242 are densely arranged in the circumferential direction as shown in FIG. 2, and the circumferential length La1 of each first magnet 241 becomes longer than the circumferential length La2 of each second magnet 242, when the radial length Lr2 of each second magnet 242 is the same as the radial length Lr1 of each first magnet 241, each second magnet 242 is farther from the stator 11 than each first magnet 241. In the case described above, the gap G2 between each second magnet 242 and the stator 11 is larger than the gap G1 between each first magnet 241 and the stator 11. On the other hand, when a dimension of each first magnet 241 is constant in the above case, the back electromotive force constant K of the motor 100 becomes higher as the radial length Lr2 of each second magnet 242 is larger as shown in FIG. 4. As the gap G2 between each second magnet 242 and the stator 11 is narrower, the magnetic force exerted on the stator 11 by each second magnet 242 becomes stronger. In FIG. 4, the back electromotive force constant K of the motor 100 is maximized under a condition C where the gap G2 becomes the above-described constant value Gs that is the smallest. Thus, by making the radial length Lr2 of each second magnet 242 longer than the radial length Lr1 of each first magnet 241, each second magnet 242 is made closer to the stator 11, and the back electromotive force constant K of the motor 100 is made larger.

The example embodiment of the present disclosure has been described above. The scope of the present disclosure is not limited to the example embodiment described above. The present disclosure is executable by adding various changes to the above-described example embodiment without departing from the scope of the disclosure. The matters described in the above example embodiment are appropriately and arbitrarily combined as long as no inconsistency occurs.

The present disclosure is useful for the motor in which the magnet unit including the plurality of magnets is provided on the radially inside surface of the rotor holder.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
    a stationary unit including a stator annularly surrounding a vertically extending central axis; and
    a rotation unit including a magnet unit disposed radially outward surface of the stator;
    wherein the rotation unit further includes a cylindrical rotor holder extending in an axial direction;
    the magnet unit is held on a radially inside surface of the rotor holder;
    the magnet unit includes a plurality of first magnets each of which has N and S poles magnetized in a radial direction, and a plurality of second magnets each of which has N and S poles magnetized in a circumferential direction;
    each first magnet and each second magnet are adjacent to each other in the circumferential direction;
    magnetic poles of radially inner end portions of the first magnets adjacent to each other in the circumferential direction via the second magnet are different from each other;
    magnetic poles of circumferential end portions of the second magnets adjacent to each other in the circumferential direction via the first magnet are different from each other;
    a first interval is provided between a radially outside surface of each first magnet and the radially inside surface of the rotor holder, and a second interval is provided between a radially outside surface of each second magnet and the radially inside surface of the rotor holder;
    when viewed in the axial direction, there is a closed space between side surfaces of the first magnets in the circumferential direction and side surfaces of the second magnets in the circumferential direction which is adjacent to the first magnets in the circumferential direction;

the closed space is bounded by the side surfaces of the first magnets, the side surfaces of the second magnets, and the radially inside surface of the rotor holder; and an adhesive fins the closed space.

2. The motor according to claim 1, wherein shapes of each first magnet and each second magnet are rectangular parallelepipeds.

3. The motor according to claim 1, wherein at least one of at least a portion of the radially outside surface of each first magnet and at least a portion of the radially outside surface of each second magnet is opposite to the radially inside surface of the rotor holder via adhesive.

4. The motor according to claim 1, wherein a radial gap between each second magnet and the stator is identical to a radial gap between each first magnet and the stator.

5. The motor according to claim 1, wherein a circumferential length of each first magnet is longer than a circumferential length of each second magnet.

6. The motor according to claim 5, wherein a radial length of each second magnet is longer than a radial length of each first magnet.

* * * * *